US012644019B2

(12) United States Patent
Doherty et al.

(10) Patent No.: US 12,644,019 B2
(45) Date of Patent: Jun. 2, 2026

(54) METHOD OF BONDING SUBSTRATES

(71) Applicant: Henkel AG & Co. KGaA, Duesseldorf (DE)

(72) Inventors: Michael Doherty, Clane (IE); Brian Deegan, Blessington (IE); Stephen Fearon, Swords (IE); David Condron, Dublin (IE); Barry Burns, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 76 days.

(21) Appl. No.: 18/605,534

(22) Filed: Mar. 14, 2024

(65) Prior Publication Data

US 2024/0294804 A1 Sep. 5, 2024

Related U.S. Application Data

(63) Continuation of application No. PCT/EP2022/084296, filed on Dec. 2, 2022.

(30) Foreign Application Priority Data

Dec. 9, 2021 (GB) ...................................... 2117826

(51) Int. Cl.
*B32B 37/12* (2006.01)
*C09J 5/02* (2006.01)
*C09J 133/04* (2006.01)

(52) U.S. Cl.
CPC ............. *C09J 5/02* (2013.01); *B32B 37/1284* (2013.01); *C09J 133/04* (2013.01);
(Continued)

(58) Field of Classification Search
CPC ........ C09J 2433/00; C09J 133/04; C09J 5/02; B32B 2457/00; B32B 2311/30;
(Continued)

(56) References Cited

U.S. PATENT DOCUMENTS 4,309,526 A 1/1982 Baccei
7,408,010 B1 8/2008 Patel et al.
(Continued)

FOREIGN PATENT DOCUMENTS

DE 102012001744 A1 8/2013
EP 3730562 A1 10/2020
(Continued)

OTHER PUBLICATIONS

International Search Report issued in connection with International PCT Patent Application No. PCT/EP2022/084296 mailed on Mar. 13, 2023.

(Continued)

*Primary Examiner* — Vishal I Patel
(74) *Attorney, Agent, or Firm* — Steven C. Bauman

(57) ABSTRACT

A method of bonding first and second substrates to each other the substrates having respective bonding surfaces to be bonded together, comprising:
(a) applying to the bonding surface of at least the first substrate a redox-active metal catalyst primer to form a primed surface;
(b) activating the primed bonding surface of the first substrate by exposing the primed bonding surface to actinic radiation;
(c) applying, to the so activated bonding surface of the first substrate, and/or or to the bonding surface of the second substrate, a UV curable anaerobic adhesive;
(d) mating the bonding surfaces together with the UV curable anaerobic adhesive therebetween; and
(e) exposing the UV curable anaerobic adhesive between the mated surfaces to actinic UV radiation. The method is particularly suited for obtaining bonds with good tensile shear strength with electrical substrates coated with an insulating varnish.

21 Claims, 2 Drawing Sheets

(52) U.S. Cl.
CPC ... *B32B 2037/1253* (2013.01); *B32B 2309/04* (2013.01); *B32B 2310/0831* (2013.01); *B32B 2310/0837* (2013.01); *B32B 2311/30* (2013.01); *B32B 2457/00* (2013.01); *C09J 2433/00* (2013.01)

(58) Field of Classification Search
CPC .... B32B 2310/0837; B32B 2310/0831; B32B 2309/04; B32B 2037/1253; B32B 37/1284
See application file for complete search history.

(56) References Cited

U.S. PATENT DOCUMENTS

| | | | | |
|---|---|---|---|---|
| 2005/0214497 | A1 | 9/2005 | Bilodeau | |
| 2005/0215655 | A1* | 9/2005 | Bilodeau | C08F 283/006 522/7 |
| 2019/0322093 | A1 | 10/2019 | Böker | |

FOREIGN PATENT DOCUMENTS

| | | | | | |
|---|---|---|---|---|---|
| GB | 2582002 | A | * | 9/2020 | C08F 290/067 |
| WO | WO-2019086634 | A1 | * | 5/2019 | C09J 5/02 |
| WO | WO-2020115289 | A1 | * | 6/2020 | C09J 7/50 |

OTHER PUBLICATIONS

Anonymous: "Loctite (R) AA 3510", Internet Citation, Aug. 1, 2018 (Aug. 1, 2018), pp. 1-3, XP009541934.
Anonymous: "Technical Data Sheet-Locitte 3504", Henkel, Oct. 1, 2014 (Oct. 1, 2014), pp. 1-3, XP093011730.
Anonymous: "TDS Loctite SF 7091", Dec. 1, 2016 (Dec. 1, 2016), pp. 1-2, XP093027238.
Anonymous: "Technical Data-Sheet SF 7649", Henkel, Jun. 1, 2014 (Jun. 1, 2014), pp. 1-2, XP093011729.

* cited by examiner

METHOD OF BONDING SUBSTRATES

FIELD OF THE INVENTION

The present invention relates to a method of bonding substrates.

DESCRIPTION OF RELATED ART

It is known in the adhesives industry that certain substrates, are difficult to bond. This may be due to various factors such as low surface energy/low surface tension properties of the materials from which the substrate(s) to be bonded are made.

Various approaches are generally used to bond such difficult to bond materials. For example, adhesive compositions have been specifically formulated for use to bond such substrates. Additionally, or alternatively, primers have been used. Primers are applied to the substrate before subsequent over application of the adhesive. Additionally, or alternatively, surface treatment of the substrates has been employed to make them more susceptible to bonding. Such treatment is often due to a physical effect such as roughening of a surface of the substrate thus making it more susceptible to bonding or a chemical treatment such as with acid.

One challenging type of substrate to bond is a substrate with a coating thereon. This may mean that while the material from which the substrate is formed may be easily bonded the coated material may be more difficult to bond as the coating has different properties.

Of particular interest in relation to the present invention is where the coating is a coating applied as an electrically insulating coating. In the present invention the term "insulation" will refer to electrical insulation.

For example, the substrate may be formed of a metal, such as steel, which is relatively easy to bond. However, the coating makes the substrate much less easy to bond. Furthermore, while removal of at least a part of the coating (for example using techniques described above) can allow bonding, this is undesirable as desirable properties imparted by the coating are lost. In particular it is undesirable to remove a coating that has been applied for the purpose of electrical insulation as of course the loss of such insulation can lead to potential electrical shorts, danger of electrical shock, and associated hazards such as fire, degradation of performance or injury.

Notwithstanding that state-of-the-art proposed solutions to these issues exist, it is desirable to provide alternative solutions so the end user has more choices available.

SUMMARY OF THE INVENTION

In one aspect, the present invention provides a method as set out in the claims.

It will be appreciated that only one of the substrates to be bonded together may be a difficult to bond substrate such as a coated substrate for example a substrate with a coating applied for the purposes of electrical insulation. In the present invention such a substrate/coating may be referred to as e-coat, e-coated, e-coating etc.

In the electrical industry such coatings are often applied to parts for electrical/electronic components. The composition that is applied to form the coating is often referred to as a varnish. In this respect the present invention is directed to bonding substrates, and in particular electrical substrates which have been coated with such a varnish. Often times the varnish imparts electrical insulation to the substrate. Typically, the electrical substrates are made from metal such as steel and have been insulated using such a coating.

Of particular interest in the present invention are coated substrates that function utilising electromagnetic induction.

Such coated substrates often form part of electrical devices, including motors, generators, transformers, sensors, and other devices that function by electromagnetic induction. The coatings impart suitable electrical insulation and have sufficient structural integrity to allow operation of the electrical device.

Such insulating coatings may be applied by encapsulation, casting or potting to a suitable substrate.

The coatings are typically epoxy resins, phenolic resins, including phenol/formaldehyde resins, and polyurethane resins.

Silicon Steel, also known as electrical steel, is steel with silicon added to it. Adding silicon to steel increases its electrical resistance, improves the ability of magnetic fields to penetrate it, and reduces the steel's hysteresis loss. Silicon steel is used in many electrical applications where electromagnetic fields are important, such as electrical stators/rotors and motors, coils, magnetic coils and transformers.

Steel used in electrical applications may also be known as: lamination steel, silicon electrical steel, silicon steel, core plate steel, C5 core plate, or transformer steel.

Some types of steel include: GO Grain Oriented/NGO Non-Grain Oriented/CRML Cold Rolled Motor Lamination.

Electrical insulation coatings are coatings that insulate steel such as silicon steel and they are often pigmented.

Some Insulation Classes for electrical steel insulation coatings are set out below:

- C3/EC-3: These are unfilled, organic based varnishes that deliver increased punch ability and have exceptional insulation properties. Typical applications for these coatings are small motors, transformers and transmitters. A special C3 coating is a self-bonding varnish, which shows the highest level of adhesive properties thanks to its adherence over the whole cross-section, even of complex geometries. It enables electrical device manufacturers to insulate and to adhere steel sheet stacks in one step while still retaining the magnetic properties and the excellent mechanical strength of the electrical steel.
- C5/EC-5: These are filled organic and inorganic based varnishes ideally used for increased insulation properties, resistance against annealing and improved weldability. Typical applications for these coatings are machines undergoing treatments like welding, Al-die casting or annealing.
- C6/EC-6: These are highly-filled organic and inorganic based varnishes that deliver increased insulation properties as well as the required resistance against pressure. Typical applications for these coatings are medium and large machines with high resistance against pressure and temperature.

Electrical Steel Coatings - Insulation classes

| Classification | Description | For Rotors/ Stators | Anti-stick treatment |
|---|---|---|---|
| C0 | Natural oxide formed during mill processing | No | No |
| C2 | Glass like film | No | No |
| C3 | Organic enamel or varnish coating | No | No |

-continued

| Electrical Steel Coatings - Insulation classes | | | |
|---|---|---|---|
| Classification | Description | For Rotors/ Stators | Anti-stick treatment |
| C3A | As C3 but thinner | Yes | No |
| C4 | Coating generated by chemical and thermal processing | No | No |
| C4A | As C4 but thinner and more weldable | Yes | No |
| C4AS | Anti-stick variant of C4 | Yes | Yes |
| C5 | High-resistance similar to C4 plus inorganic filler | No | No |
| C5A | As C5, but more weldable | Yes | No |
| C5AS | Anti-stick variant of C5 | Yes | Yes |
| C6 | Inorganic filled organic coating for insulation properties | Yes | Yes |

The method of the invention is suitable for use with all of the classes of insulation coating given above. The method of the invention utilises a primer, an anaerobic/UV anaerobic adhesive and a UV light source. In this method the area to be bonded is coated with a primer and then exposed for activation by UV light. A UV anaerobic adhesive is applied, the bond is assembled and optionally clamped. The edge of the (clamped) bond is exposed to the UV light. This method can be used to bond e-coated substrates such as e-coated C5 substrates.

The use of UV activated primer with anaerobic/UV anaerobic adhesives significantly improves the bond strengths in certain applications for example in bonding of e-coat steel for example to another e-coated steel substrate. For example, the method of the invention may be used to achieve greater bonding where at least one of the substrates to be bonded is coated metal, such as a coated steel for example an e-coat C5 steel. The improved performance is seen when compared to the use of a UV anaerobic/UV anaerobic plus primer system.

Substrates that can be bonded by the method of the present invention include e-coated steel. Examples of commercially available e-coated steel include: Waelzholz M310-65A according to EN10106—supplied with mill certificate to EN 10204-3.1 Waelzholz 2× AN8—C5 classified—2.0-6.0 μm thick per side (100 mm×25 mm×0.5 mm).

The coatings are filled organic and inorganic based varnishes typically applied to steel for increased insulation properties, resistance against annealing and/or improved weldability. Typical applications for these coatings are machines undergoing treatments like welding, Al-die casting or annealing. The coatings may be epoxy based.

The method of the invention is suited for bonding such substrates for example in the assembly of electrical motor parts such as lamination stacks which may require bonding of coated substrates to each other for example in the form of a stack or array. Such coated substrates may be C5 e-coated substrates.

The use of UV activated primer with anaerobic/UV anaerobic adhesives significantly improves the bond strengths between such substrates, for example of e-coat to e-coat C5 steel, as compared to the use of a UV anaerobic/UV anaerobic plus primer system.

For example, the method of the present invention may be used to bond together the individual components forming a lamination stack in an electric motor. For example, a stack within an electric motor may comprise individual stators or rotors bonded together.

In general, the same parameters relating to the radiation may be used for both the activation of the primer and for UV curing of the anaerobic adhesive.

The present invention relates to a method of bonding first and second substrates to each other the substrates having respective bonding surfaces to be bonded together, comprising:

(a) applying to the bonding surface of at least the first substrate a redox-active metal catalyst primer to form a primed surface;

(b) activating the primed bonding surface of the first substrate by exposing the primed bonding surface to actinic radiation;

(c) applying, to the so activated bonding surface of the first substrate, and/or or to the bonding surface of the second substrate, a UV curable anaerobic adhesive;

(d) mating the bonding surfaces together with the UV curable anaerobic adhesive therebetween; and (e) exposing the UV curable anaerobic adhesive between the mated surfaces to actinic UV radiation.

Optionally in a method of the invention, step (a) comprises applying to the respective bonding surfaces of the first substrate and the second substrate a redox-active metal catalyst primer to form respective primed surfaces; and step (b) comprises activating the respective primed bonding surfaces of the first substrate and the second substrate by exposing those primed bonding surfaces to actinic radiation.

Suitably step (c) comprises applying, to the so activated bonding surface of the first substrate, and to the so activated bonding surface of the second substrate, a UV curable anaerobic adhesive.

The actinic radiation of step (b) may have a wavelength of from about 10 nm to about 10,000 nm; such as from 100 to 700 nm, optionally 300 to 400 nm for example 360 to 380 nm. One useful range is 100 to 400 nm.

The duration of the exposure to the actinic radiation of step (b) may be from 1 to 300 seconds, such as 1.5 to 200 seconds, optionally 2 to 100 seconds, for example 5 to 60 seconds.

The actinic radiation of step (b) may have an intensity of 1 to 5000 $mW/cm^2$, such as 50 to 900 $mW/cm^2$, suitably 100 to 800 $mW/cm^2$, for example 120 to 700 $mW/cm^2$.

The total energy to which the primed bonding surface of the first substrate and/or the primed bonding surface of the second substrate is exposed during step (b) is desirably from 1 to 300000 $mJ/cm^2$, such as 100 to 200000 $mJ/cm^2$, suitably 250 to 100000 $mJ/cm^2$, for example 0.5 $J/cm^2$ to 40 $J/cm^2$.

The actinic radiation of step (e) may have a wavelength of from about 10 nm to about 10,000 nm; such as from 100 to 700 nm, optionally 300 to 400 nm for example 360 to 380 nm. One useful range is 100 to 400 nm.

The duration of the exposure to the actinic radiation of step (e) may be from 1 to 300 seconds, such as 1.5 to 200 seconds, optionally 2 to 100 seconds, for example 5 to 60 seconds.

Optionally the actinic radiation of step (e) has an intensity of 1 to 5000 $mW/cm^2$, such as 50 to 900 $mW/cm^2$, suitably 100 to 800 $mW/cm^2$, for example 120 to 700 $mW/cm^2$.

The total energy to which the UV curable anaerobic adhesive is exposed during step (e) may be from 1 to 300000 $mJ/cm^2$, such as 100 to 200000 $mJ/cm^2$, suitably 250 to 100000 $mJ/cm^2$, for example 0.5 $J/cm^2$ to 40 $J/cm^2$.

The redox-active metal catalyst primer may comprise a redox-active metal catalyst selected from cobalt (II) naphthenate; copper carbonate; copper (II) acetylacetonate; silver nitrate; vanadium (III) acetylacetonate, iron (II) naphthenate, copper disodium ethylenediamine tetraacetic acid (EDTA·2Na·Cu(II)), vanadyl acetylacetonate, iron (II) acetate, or a combination thereof.

Suitably the redox-active metal catalyst primer comprises a copper-based primer, for example wherein the redox-active metal catalyst primer comprises at least one Cu II salt. The Cu II salt may be selected from Cu acac (copper (II) acetylacetonate) and copper (II) ethyl hexanoate such as copper (II) 2-ethyl hexanoate and combinations thereof.

The redox-active metal catalyst primer may include a redox-active metal catalyst dissolved in solvent, such as a reactive solvent for example a (meth)acrylate monomer such as hydroxy propyl methacrylate ("HPMA"), methacrylic acid or propylene glycol dimethacrylate and combinations thereof.

Optionally the redox-active metal catalyst primer includes an organic solvent such as acetone or dichloromethane.

Desirably the redox-active metal catalyst primer comprises from 0.01 to 0.4%, such as 0.05 to 0.4%, for example 0.1% to 0.3%, by weight based on the total weight of the solution, of an active redox-active metal catalyst such as a copper salt.

The substrate may be a substrate with a coating thereon and further wherein the coating is a coating applied by curing a curable coating composition on the substrate.

The substrate may be steel optionally wherein the substrate forms a part of an electric motor.

The coating may be formed by epoxy resins, phenolic resins, including phenol/formaldehyde resins, and polyurethane resins and combinations thereof.

Polymerizable (Meth)Acrylate Ester Monomers (Meth)acrylate monomers suitable for use in the anaerobically curable compositions described herein may be chosen from a wide variety of materials, such as those represented by $H_2C{=}CGCO_2R^4$, where G is hydrogen, halogen or alkyl groups having from 1 to about 4 carbon atoms, and $R^4$ is selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

One class of monomers suited for use in this invention comprises acrylate esters having the following general formula:

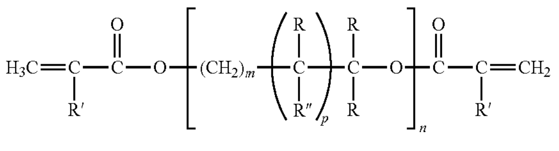

wherein R represents a radical selected from the group consisting of hydrogen, lower alkyl of 1-4 carbon atoms, inclusive, hydroxy alkyl of 1-4 carbon atoms inclusive, and

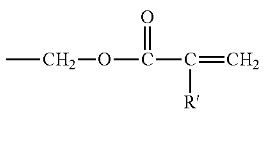

R' is a radical selected from the group consisting of hydrogen, halogen, and lower alkyl of 1-4 carbon atoms; R" is a radical selected from the group consisting of hydrogen, —OH and

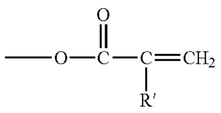

m is an integer equal to at least 1, e.g., from 1 to 8 or higher, for instance, from 1 to 4 inclusive; n is an integer equal to at least 1, for example, 1 to 20 or more; and p is one of the following: 0.1.

The polymerizable (meth)acrylate ester monomers utilized in accordance with the invention and corresponding to the above general formula are exemplified by, but not restricted to, the following materials: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate and trimethylol propane triacrylate. Of these, the preferred monomers are triethylene glycol dimethacrylate and polyethylene glycol dimethacrylate.

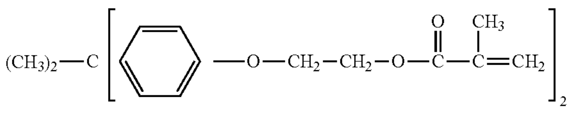

Typical examples of polyacrylate esters corresponding to the above general formula are di-, tri- and tetraethylene glycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive.

Suitably, the polar group is selected from the group consisting of labile hydrogen, heterocyclic ring, hydroxy, amino, cyano, and halo polar groups. Typical examples of compounds within this category are cyclohexyl methacrylate, tetrahydrofurfuryl methacrylate, hydroxyethyl methacrylate, hydroxypropyl methacrylate, t-butylaminoethyl methacrylate, cyanoethylacrylate, and chloroethyl methacrylate.

Another preferred class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureide groups.

Additional (meth)acrylate monomers suitable for use herein include polyfunctional (meth)acrylate monomers, such as, but not limited to, di- or tri-functional (meth) acrylates like polyethylene glycol di(meth)acrylates, tetrahydrofuran (meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

The polymerizable (meth)acrylate ester monomers may be present in the composition in an amount from about 10 to about 90 weight percent, suitably about 30 to about 70 weight percent, based on the total weight of the composition.

Redox-Active Metal Catalyst

Cure of the anaerobically curable composition can be initiated by a redox-active metal catalyst comprising a transition metal when the anaerobically curable composition is contacted with the plastic substrate under anaerobic conditions. The redox-active metal catalyst enhances the strength of cure, speed of cure, and combinations thereof of the compositions described herein.

The transition metal included in the redox-active metal catalyst may be titanium, chromium, manganese, iron, cobalt, nickel, copper, zinc, silver, vanadium, molybdenum, ruthenium, and combinations thereof. Further, the transition metal can be provided in the form of a salt. For example, the transition metal salt may be selected from cobalt (II) naphthenate; copper carbonate; copper (II) acetylacetonate; silver nitrate; vanadium (III) acetylacetonate and combinations thereof. Suitably, the redox-active metal catalyst is iron (II) naphthenate, copper disodium ethylenediamine tetraacetic acid (EDTA·2Na·Cu(II)), or copper naphthenate, vanadium acetylacetonate, vanadyl acetylacetonate, iron (II) acetate, or a combination thereof.

The redox-active metal catalyst may be included in the composition in an amount from about 0.0001 to about 2, suitably about 0.0002 to about 0.5 weight percent, based on the total weight of the composition.

Peroxide

Peroxides can serve as a free radical generating source which initiate free radical curing of the anaerobically curable compositions described herein. Several well-known initiators of free radical polymerization can be incorporated into the anaerobically curable compositions described herein including, without limitation, peroxides which have a half-life of 10 hours at a temperature between about 80° and 140° C., such as cumene hydroperoxide ("CHP"), para-menthane hydroperoxide, t-butyl hydroperoxide ("TBH") and t-butyl perbenzoate. Other suitable peroxides include benzoyl peroxide, dibenzoyl peroxide, 1,3-bis(t-butylperoxyisopropyl) benzene, diacetyl peroxide, butyl 4,4-bis(t-butylperoxy) valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Further, hydroperoxides which derive from hydrocarbons with a chain length of 3 to 18 carbon atoms can be included in the compositions described herein. For example, cumene hydroperoxide, tert-butyl hydroperoxide, methyl ethyl ketone hydroperoxide, diisopropyl benzene hydroperoxide.

The peroxide may be present in the composition in an amount from about 0.5 to about 10 weight percent, suitably from about 1 to about 5 weight percent, based on the total weight of the composition.

Suitable compositions which may be used within the present invention include anaerobically curable compositions comprising (i) one or more polymerizable (meth) acrylate ester monomers, (ii) a redox-active metal catalyst, (iii) saccharin or a saccharin derivative, (iv) a peroxide, and (v) a benzoyl functionalized compound, and desirably those wherein the composition does not gel after about 24 hours of storage at room temperature. The components (i) to (v) of the invention are distinct components. For example, the redox-active metal catalyst is not a benzoyl functionalized compound. For example, the benzoyl functionalized compound is not a peroxide.

Benzoyl Functionalized Compound

A benzoyl functionalized compound in a composition of the invention is desirable because the inclusion of a benzoyl functionalized compound stabilizes the composition, for example it may stabilize the redox-active metal catalyst.

The benzoyl functionalized compound can be a photoinitiator. For example, those photoinitiators available commercially from BASF Chemical, Germany, under the "IRGACURE" and "DAROCUR" tradenames are desirable, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl phosphine oxide and 2-hydroxy-2-methyl-1-phenyl-propan-1-one) and "DAROCUR" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one). Of course, combinations of these materials may also be employed herein. The structures of preferred photoinitiators are shown below.

Irgacure 651

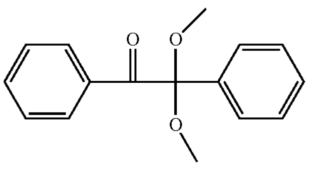

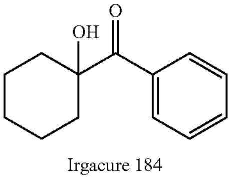

Irgacure 184

-continued

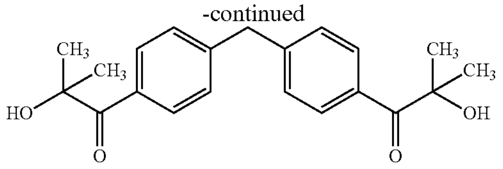

Irgacure 127

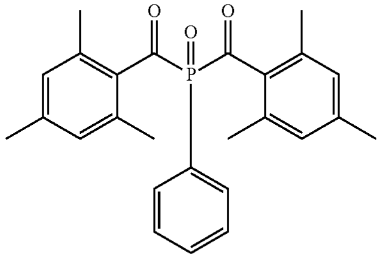

Irgacure 819

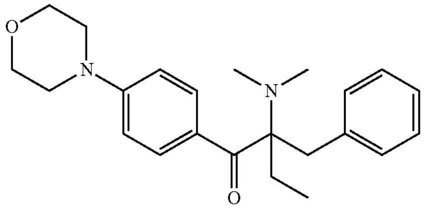

Irgacure 369

The benzoyl functionalized compounds may be included in the composition in an amount from about 0.1 to about 5 weight percent, suitably about 0.5 to about 2 weight percent, based on the total weight of the composition. Desirably the benzoyl functionalized compound is present in an excess amount relative to the redox-active metal catalyst. On a weight basis, based on the total weight of the composition, the benzoyl functionalized compound is desirably present in an excess amount relative to the redox-active metal catalyst. For example, the benzoyl functionalized compound is desirably present in an excess amount relative to the redox-active metal catalyst at a ratio of at least about 3:1; for example, at least about 4:1 such as at least about 5:1.

Optional Components

Additional components can be included in the anaerobically curable compositions disclosed herein such that these additional components do not interfere with the functionality of the components described above.

For example, acrylic acid can be included in the composition to enhance the cure and adhesion in an amount from about 0 to about 20 weight percent, suitably from about 1 to about 10 weight percent, based on the total weight of the composition.

(Meth)acrylate oligomers can further optionally be included in the composition. (Meth) acrylate oligomers can be included to improve fully cured peel strengths of the compositions described herein. For example, (meth)acrylate capped polyurethane oligomers can be included. A variety of commercial urethane (meth)acrylate oligomer resins are known. Suitably, this component is, or includes, a block resin such as described in U.S. Pat. No. 4,309,526, comprising at least one polyether block derived from a polyether polyol and at least one hard block derived from an aromatic or cycloaliphatic diisocyanate and an aromatic or cycloaliphatic polyol. Especially preferred are such resins in which the polyether polyol is an aliphatic polyether having a number average molecular weight of from about 400 to about 10,000, more suitably about 700 to about 3,500.

If included, (meth)acrylate oligomers can be present in the anaerobically curable composition in an amount from about 5 to about 90 weight percent, suitably from about 10 to about 50 weight percent, based on the total weight of the composition.

Amines can optionally be included in the composition to cause the monomer to polymerize in the absence of oxygen and prevent polymerization of the monomer in the presence of oxygen.

The nature of the amine is not critical for purposes of the anaerobically curable compositions disclosed herein, i.e., primary, secondary, tertiary, aliphatic or aromatic amines can be used. For example, primary aliphatic amines such as ethyl, n-butyl, n-propyl, isopropyl, n-hexyl and t-butyl amines conveniently can be used. Also primary aromatic amines, such as aniline, p-toluidine, or p-naphthylamine, xylidine, benzylamine or p-benzylaniline can be used. Aliphatic or aromatic secondary amines also can be used. Typical examples of acceptable secondary amines are diethylamine, dipropylamine, diisopropylamine, diphenylamine, N-phenyl benzylamine and N-allylaniline.

Tertiary amines are organic amines wherein all three valences of the nitrogen atom are satisfied by carbon atoms. Tertiary amines are also suitable for use in the compositions described herein. The carbon atoms in the tertiary amines may be part of alkyl, carbocyclic or heterocyclic groups, either unsubstituted or hydroxyl-substituted. Generally, the trialkylamines and dialkylanilines are most suitably employed. However, alkaloids and other compounds within the scope of the above definition are also suitable for the present invention. Exemplary of the various tertiary amines that may be utilized are triethylamine, tripropylamine, tributylamine, triamylamine, triphenylamine, dimethylaniline, ethyldiethanolamine, triethanolamine and piperidine.

Generally, amines suitable for use in the compositions described herein can be represented by the formula R"—R—NH, wherein R" is a hydrocarbon radical containing up to about 14 carbon atoms, suitably an aliphatic or aromatic hydrocarbon group containing up to about eight carbon atoms, and R is either hydrogen or R. Naturally, either R" or R can contain any substituent or linkage, hydrocarbon or otherwise, which does not affect the condensation product adversely for the purpose disclosed herein.

The amine or amines used in the compositions described herein are suitably liquid at room temperature for ease in handling and mixing, although gaseous and solid compounds may be employed by dispersing them in the monomer.

A variety of secondary and tertiary organic amines, suitably secondary aromatic amines can be included in the anaerobically curable compositions disclosed herein.

Amines, suitably secondary aromatic amines, can be included in the composition in an amount up to about 5 weight percent, suitably about 0.001 to about 2 weight percent based on the total weight of the composition.

Chelators can further optionally be included in the composition. Chelators, such as ethylenediamine tetraacetic acid (EDTA), can be employed in the anaerobically curable compositions described herein to sequester metal ions. For example, chelators can be included in the composition in an amount from about 0.0001 to about 1 weight percent, suitably from about 0.0002 to about 0.5 weight percent, based on the total weight of the composition.

Free radical stabilizers can further optionally be included in the composition. Phenols such as hydroquinone, benzoquinone, naphthoquinone, anthraquinone, butylated hydroxytoluene and p-methoxyphenol can be used to prevent premature polymerization due to peroxide decomposition and formation of free radicals. For example, free radical stabilizers can be included in the composition in an amount of about 0.0001 to about 2 weight percent, suitably about 0.0002 to about 0.5 weight percent, based on the total weight of the composition.

Silica and inorganic fillers can also optionally be included in the composition. Silicas are can be added to make the composition more viscous, i.e. thixotropic. This is beneficial for non-flow and non-sag properties such as for use in gasket sealing. Suitably, when silica and/or inorganic fillers are included in the composition they are included in an amount of up to about 10 weight percent, suitably up to about 5 weight percent, based on the total weight of the composition.

Additional resins can also optionally be included in the composition. These additional resins can include but are not limited to polyester and polyurethanes. These resins can be included in the composition in an amount of up to about 50 weight percent, suitably up to about 20 weight percent, based on the total weight of the composition.

BRIEF DESCRIPTION OF THE DRAWINGS

Embodiments of the invention will be described, by way of example only, with reference to the accompanying drawings in which.

DETAILED DESCRIPTION

Figure 1:
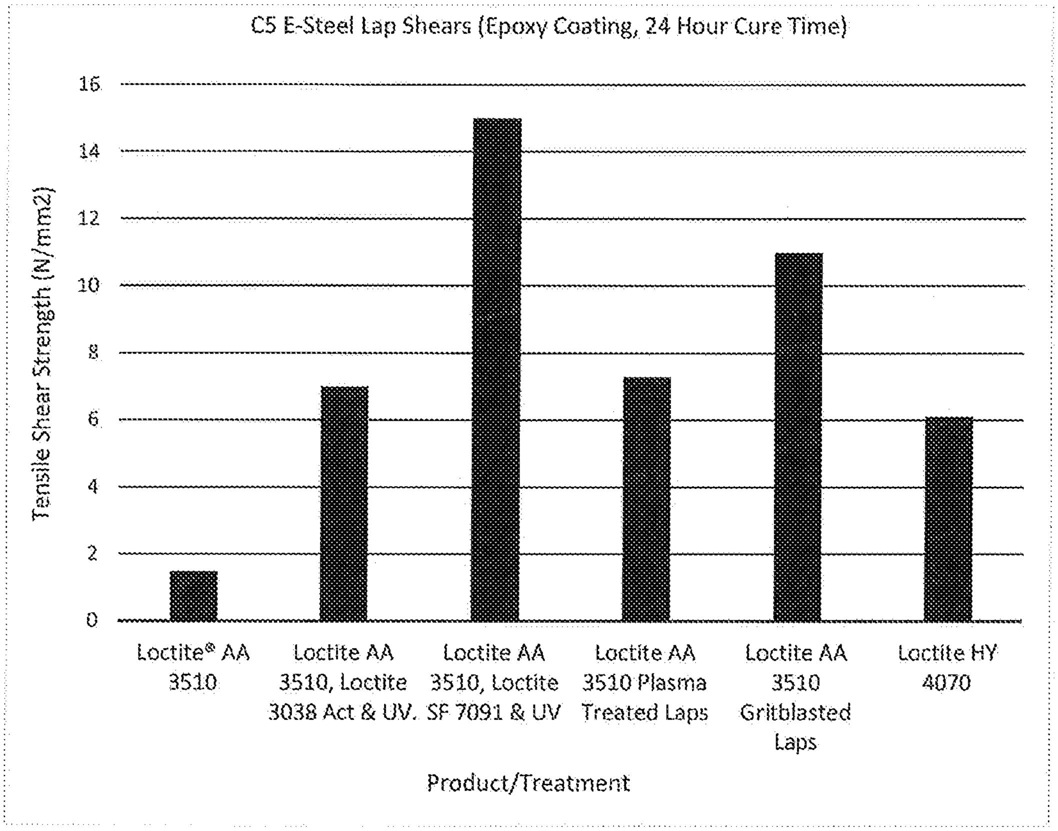
FIG. 1 is a plot of tensile shear strength in $N/mm^2$ for C5 E-steel lapshears with an epoxy coating. The cure time was 24 hours. As indicated on the X axis the tensile shear strength was tested using different adhesive/treatment of lapshears/activator/UV combinations. In this respect "AA"=anaerobic adhesive, "Act"=activator, UV=ultra violet irradiation, "laps"=lapshears, "Hy" indicates hybrid. All the numbers on the X axis are product codes for commercially available Loctite® products. These Loctite® products are available from Henkel Ireland and other Henkel sites.

Described below is a series of experiments highlighting a method to improve adhesion of substrates that are provided with an electrically insulating coating such as adhesion of an e-coat steel substrate to another e-coat steel substrate.

A method of bonding according to the invention was carried out. Comparative tests/methods were also carried out.

The method of the invention comprises bonding first and second substrates to each other the substrates having respective bonding surfaces to be bonded together, comprising:

(a) applying to the bonding surface of at least the first substrate a redox-active metal catalyst primer to form a primed surface;

(b) activating the primed bonding surface of the first substrate by exposing the primed bonding surface to actinic radiation;

(c) applying, to the so activated bonding surface of the first substrate, and/or or to the bonding surface of the second substrate, a UV curable anaerobic adhesive;

(d) mating the bonding surfaces together with the UV curable anaerobic adhesive therebetween; and (e) exposing the UV curable anaerobic adhesive between the mated surfaces to actinic UV radiation.

One irradiation source used was a Light Hammer® 6 UV system. This is a device that emits UV light.

In all aspects of the present invention where actinic radiation is referred to the actinic radiation is from a light source specifically arranged to irradiate the substrate to be bonded, for example the source is within 1 metre thereof, for example within 30 cm thereof. So exposure means exposure to the actinic radiation from such a light source and does not include ambient light such as natural light, light from overhead lights etc.

The substrates bonded were e-coated steel. In particular substrates of the materials mentioned above were utilised: Waelzholz M310-65A according to EN10106—supplied with mill certificate to EN 10204—3.1 Waelzholz 2×AN8—C5 classified. EN 10106 conforming electrical steel strip grades are standard grades for many traditional applications. These grades are defined as non-grain-oriented, finally annealed electrical steel strip. The dimensional tolerances conform to EN 10106. Lapshears used in the experiments were made of the C-5 materials and were 2.0-6.0 μm thick per side and had dimensions 100 mm×25 mm×0.5 mm. (Mill Test Certificate (MTC), or Mill Test Report (MTR), is issued by a manufacturer to certify the chemical and mechanical features of a product and its compliance to the applicable norms and technical specifications. Typically, mill test certificates conform to the EN 10204 standard and are related to steel products. Certification of steel plates rolled in Europe is generally to EN 10204. The actual certificate will depend on the plate offered but will either be 3.1 or 3.2. A 3.1 or 3.2 MTC means that the actual plate or heat sold will have been tested and a Mill Test Certificate (MTC) will accompany the plate. AN8 is a coating applied by Waelzholz.)

As above the coatings are filled organic and inorganic based varnishes typically applied to steel for increased insulation properties, resistance against annealing and/or improved weldability. Typical applications for these coatings are machines undergoing treatments like welding, Al-die casting or annealing.

The UV curable anaerobic adhesive used in the testing was Loctite® AA 3510. ("AA"=anaerobic adhesive.)

The redox-active metal catalyst primer used was Loctite® 7091. It includes an organocopper compound and reactive methacrylate monomer as solvent.

The tests were carried out according to the following standards:

(i) ASTM D1002-05 (Oct. 1, 2005) Strength Properties of Adhesives in Shear by Tension Loading (Metal-to-Metal)

(ii) ASTM D3163 Strength Properties of Adhesively Bonded Rigid Plastic Lap-Shear Joints in Shear by Tension Loading (iii) ISO 4587 Adhesives-Determination of Tensile Lap-Shear Strength of High Strength Adhesive Bonds 5.1.4 DIN EN 1465 Adhesives-Determination of Tensile Lap-Shear Strength of Rigid-to-rigid Bonded Assemblies.

For the tests above M310-65A C5 lapshears were used.

The Light Hammer® 6 was used as an actinic UV radiation source. The Light Hammer® 6 was used for step (b) and (e) where indicated (Tables 1 to 3).

Loctite® 7091 was applied to both lapshears to prime their respective surfaces.

The Light Hammer® 6 was used to irradiate and activate the primed surfaces. Each primed surface was irradiated for 60 seconds at an intensity of approx. 5 W/cm$^2$. It was used in the same way for step (e) where indicated (Tables 1 to 3). The output from the Light Hammer® 6 was measured using a Power Puck™ as 5 W/cm$^2$ in total (UVV 2.6 W/cm$^2$; UVA 1.8 W/cm$^2$; UVB 0.7 W/cm$^2$; UVC 0.1 W/cm$^2$.

Loctite® 3510 was applied to one of the activated surfaces and the lapshears were mated together to form a mated laps shear assembly.

Where indicated (Table 4) for step (b) and step (e) the UV source was a Loctite® UVALOC 1000 UV Cure Chamber. The mated laps shear assembly was placed in the Loctite® UVALOC 1000 UV Cure Chamber ("UVALOC 1000"). The bonded assembly was arranged so that the bond line on each side of the lapshears was irradiated for 60 seconds at an intensity of 200 mW/cm$^2$.

A series of tests were carried out as set out below.

TABLE 1

(Comparative Examples)

| Sample | ACM-DUB-0031-52-01 1) Applied 3510 to lapshears 2) Clamped bonds and left to cure overnight | ACM-DUB-0031-52-02 1) Applied 3510 to lapshears 2) Clamped bonds and irradiate 3) Left to cure overnight | ACM-DUB-0031-52-04 1) Applied 7091 primer to lapshear 2) Irradiated primed lapshear 3) Applied 3510 and clamped, left overnight | ACM-DUB-0031-52-05 1) Applied 7091 primer followed by Loctite 3510 and clamp bonds. 2) Left to cure overnight. No UV |
|---|---|---|---|---|
| | 24 h @ RT N/mm$^2$ | | | |
| 1 | 1.53 | 0.62 | 5.32 | 2.88 |
| 2 | 1.42 | 1.03 | 6.19 | 2.74 |
| 3 | 1.19 | 1.12 | 7.95 | 2.90 |
| Avg. | 1.38 | 0.92 | 6.49 | 2.84 |

In Table 1 above:

the "ACM . . . " codes are an identifier reference/code for respective tests. "3510" and "7091" are shorthand for the respective Loctite ® products 3510 and 7091 discussed above. Each test was performed with three samples as labelled by "Sample" 1-3 above. The tensile shear strength results over the three tests were averaged as indicated by "Avg.". 24 hr @ RT N/mm$^2$ indicates the tensile shear strength in N/mm$^2$ after 24 hours at room temperature.

ACM-DUB-0031-52-01 is a comparative test where the Loctite ® 3510 is applied to the lapshears and the lapshears are clamped together and left for 24 hours before testing. This test omits priming and all UV exposure steps.

ACM-DUB-0031-52-02 is a comparative test where the Loctite ® 3510 is applied to the lapshears and the lapshears are clamped together and irradiated using the Light Hammer ® 6 for 60 seconds at an intensity of approx. 5 W/cm$^2$ and then left for 24 hours before testing. This test omits priming and UV activation of the primed surface steps.

ACM-DUB-0031-52-03 is a comparative test where the Loctite ® 7091 primer is applied to the lapshears. The primed lapshears are irradiated using the Light Hammer ® 6 for 60 seconds at an intensity of approx. 5 W/cm$^2$. Loctite ® 3510 is then applied to the activated primed lapshears and the lapshears are clamped together and then left for 24 hours before testing. This test omits irradiation of the lapshears after they have been brought together.

ACM-DUB-0031-52-04 is a comparative test where the Loctite ® 7091 primer is applied to the lapshears and the Loctite ® 3510 is applied to the primed lapshears and the lapshears are clamped together and left for 24 hours before testing. This test omits all UV exposure steps.

While some of the results are better than others the conclusion from Table 1 is that the tensile shear strengths are relatively low and it is desirable to achieve better tensile shear strengths. For example, it is desirable is to achieve a tensile shear strength greater than 10 N/mm$^2$.

Some further testing was carried out as set out in Table 2. Table 2 includes comparative examples and an example of the invention.

TABLE 2

| Sample | ACM-DUB-0031-53-01 1) Irradiated lapshears for 60 s 2) Applied 3510 and clamp bonds 3)Clamped bonds are left overnight to cure - NO UV of clamped bonds | ACM-DUB-0031-53-02 1) Irradiated the lapshears for 60 s 2) Applied 3510 and clamp bonds 3) Irradiated clamped bondsfor 60 s, left overnight to cure | ACM-DUB-0031-53-03 1) Applied 7091 primer to lapshear 2) Irradiated primed lapshear 3) Applied 3510 and clamped, left overnight | * ACM-DUB-0031-53-04 * 1) Applied 7091 to lapshears 2)Irradiated the primed lapshears 3) Applied 3510 and clamped bonds 4) irradiated bonds for 60 s and left overnight to cure |
|---|---|---|---|---|
| | 24 h @ RT N/mm$^2$ | | | |
| 1 | 1.71 | 1.55 | 4.67 | 12.70 |
| 2 | 1.71 | 1.76 | 6.06 | 10.00 |

TABLE 2-continued

| Sample | ACM-DUB-0031-53-01 1) Irradiated lapshears for 60 s 2) Applied 3510 and clamp bonds 3)Clamped bonds are left overnight to cure - NO UV of clamped bonds | ACM-DUB-0031-53-02 1) Irradiated the lapshears for 60 s 2) Applied 3510 and clamp bonds 3) Irradiated clamped bondsfor 60 s, left overnight to cure | ACM-DUB-0031-53-03 1) Applied 7091 primer to lapshear 2) Irradiated primed lapshear 3) Applied 3510 and clamped, left overnight | * ACM-DUB-0031-53-04 * 1) Applied 7091 to lapshears 2)Irradiated the primed lapshears 3) Applied 3510 and clamped bonds 4) irradiated bonds for 60 s and left overnight to cure |
|---|---|---|---|---|
| | 24 h @ RT N/mm$^2$ | | | |
| 3 | 2.05 | 1.41 | 5.54 | 10.70 |
| 4 | 1.49 | 4.05 | 5.96 | 9.40 |
| 5 | | 3.76 | 4.62 | 12.10 |
| Avg. | 1.74 | 2.51 | 5.37 | 10.98 |

In Table 2 above:

the "ACM . . . " codes are an identifier reference/code for respective tests. "3510" and "7091" are shorthand for the respective Loctite ® products 3510 and 7091 discussed above. Each test was performed with four/five samples as labelled by "Sample" 1-5 above. The tensile shear strength results over the four/five tests were averaged as indicated by "Avg.". 24 hr @ RT N/mm$^2$ indicates the tensile shear strength in N/mm$^2$ after 24 hours at room temperature.

ACM-DUB-0031-53-01 is a comparative test where the lapshears are irradiated using the Light Hammer ® 6 for 60 seconds at an intensity of approx. 5 W/cm$^2$. Loctite ® 3510 is applied to the lapshears and the lapshears are clamped together and left for 24 hours before testing. This test omits priming and omits irradiation of the lapshears after they have been brought together.

ACM-DUB-0031-53-02 is a comparative test where the lapshears are irradiated using the Light Hammer ® 6 for 60 seconds at an intensity of approx. 5 W/cm$^2$. Loctite ® 3510 is applied to the lapshears and the lapshears are clamped together and irradiated using the Light Hammer ® 6 for 60 seconds at an intensity of approx. 5 W/cm$^2$ and then left for 24 hours before testing. This test omits priming.

ACM-DUB-0031-53-03 is a comparative test where Loctite ® 7091 primer is applied to the lapshears and the lapshears are irradiated using the Light Hammer ® 6 for 60 seconds at an intensity of approx. 5 W/cm$^2$. Loctite ® 3510 is applied to the lapshears and the lapshears are clamped together and then left for 24 hours before testing. This test omits irradiation of the lapshears after they have been brought together.

ACM-DUB-0031-53-04 is a test which is within the scope of the present invention where Loctite ® 7091 primer is applied to the lapshears and the lapshears are irradiated using the Light Hammer ® 6 for 60 seconds at an intensity of approx. 5 W/cm$^2$. Loctite ® 3510 is applied to the lapshears and the lapshears are clamped together and irradiated using the Light Hammer ® 6 for 60 seconds at an intensity of approx. 5 W/cm$^2$ and then left for 24 hours before testing. This test includes all steps of the method of the present invention.

Some further testing was carried out as set out in Table 3 which includes a comparative example and an example of the invention.

TABLE 3

| Sample | ACM-DUB-0031-54-01 1) Irradiated the lapshears for 60 s 2) Applied 3510 and clamped bonds and irradiated bonds for 60 s, left overnight | ACM-DUB-0031-54-02 1) Applied 7091 to lapshears 2)Irradiated the primed lapshears 3) Applied 3510, clamped bonds and irradiated bonds for 60 s and left overnight to cure |
|---|---|---|
| | 24 h @ RT N/mm2 | |
| 1 | 3.57 | 9.21 |
| 2 | 3.22 | 10.40 |
| 3 | 3.75 | 13.50 |
| 4 | 3.67 | 12.90 |
| 5 | 3.02 | 10.60 |
| Avg. | 3.45 | 11.32 |

In Table 3 above:

the "ACM . . . " codes are an identifier reference/code for respective tests. "3510" and "7091" are shorthand for the respective Loctite ® products 3510 and 7091 discussed above. Each test was performed with five samples as labelled by "Sample" 1-5 above. The tensile shear strength results over the five tests were averaged as indicated by "Avg.". 24 hr @ RT N/mm$^2$ indicates the tensile shear strength in N/mm$^2$ after 24 hours at room temperature.

ACM-DUB-0031-54-01 is a comparative test where the lapshears are irradiated using the Light Hammer ® 6 for 60 seconds at an intensity of approx. 5 W/cm$^2$. Loctite ® 3510 is applied to the lapshears and the lapshears are clamped together and irradiated using the Light Hammer ® 6 for 60 seconds at an intensity of approx. 5 W/cm$^2$ and then left for 24 hours before testing. This test omits priming. This test is essentially a repeat of example ACM-DUB-0031-53-02.

ACM-DUB-0031-54-02 is a test which is within the scope of the present invention where Loctite ® 7091 primer is applied to the lapshears and the lapshears are irradiated using the Light Hammer ® 6 for 60 seconds at an intensity of approx. 5 W/cm$^2$. Loctite ® 3510 is applied to the lapshears and the lapshears are clamped together and irradiated using the Light Hammer ® 6 for 60 seconds at an intensity of approx. 5 W/cm$^2$ and then left for 24 hours before testing. This test includes all steps of the method of the present invention. This is essentially a repeat of example ACM-DUB-0031-53-04.

COMMENTS/CONCLUSIONS

It can be seen that utilising a method of the invention a skilled person can achieve a target of at least 10 N/mm$^2$. In tests carried out within the present invention there was instant fixture between the substrates.

Further Testing

In order to show that a range of intensities can be used, the inventors investigated using different a different UV source. The Light Hammer® 6 is a high intensity UV system. A UVALOC system is lower intensity. The aim was to illustrate a wide range of intensities (W/cm$^2$), energy of total exposure (J/cm$^2$) can be used to achieve high bond strength (>10 N/mm$^2$).

To do so they utilised the Loctite® UVALOC 1000 UV Cure Chamber, which is a high-performance modular curing system consisting of a cure chamber, lamp housing, and controller. The chamber has four rack levels to accommodate a slide-in tray that allows for easy positioning of parts of various heights at the level of optimum exposure. A perforated aluminium plate allows positioning of customized part holders. The lamp is shielded by a timed control shutter that eliminates UV exposure to operators during loading or unloading of parts. A door safety switch prevents opening while exposure is in progress. The cure time is controlled by the built-in timer and can be operated in a continuous or timed mode. The exposure cycle is triggered by footswitch, panel-mount start button, or PLC interface.

Tests within the method of the invention and comparative tests were repeated using the UVALOC 1000 where for both irradiation steps the assembly was placed in the UVALOC 1000 and exposed to the irradiation for 60 seconds at an intensity of 200 mW/cm$^2$ for both steps. This achieved a desirable average tensile shear strength of 14.74 N/mm$^2$.

TABLE 4

| Sample | ACM-DUB-0031-57-01 1) Loctite 3510 - clamp bonds. No irradiation of lapshears 2) Leave for 24 h @ RT before testing | ACM-DUB-0031-57-02 1)Loctite 7091 + Loctite AA 3510 -no irradiation of clamped bond 2)Leave for 24 h @ RT before testing | ACM-DUB-0031-57-03 1) Apply Loctite 7091 + Loctite AA 3510 2) Irradiate clamped bond for 60 s 3) Leave for 24 h @ RT before testing | ACM-DUB-0031-57-04 1) Irradiate lapshears for 60 s 2) Apply Loctite AA3510, clamp bond and irradiate for 60 s 3) Leave for 24 h @ RT before testing |
|---|---|---|---|---|
| | 24 h @ RT N/mm$^2$ | | | |
| 1 | 1.84 | 2.22 | 5.24 | 2.12 |
| 2 | 0.77 | 2.50 | 2.47 | 3.36 |
| 3 | 1.12 | 1.96 | 3.63 | 0.97 |
| 4 | | 2.47 | 6.71 | 1.61 |
| 5 | | 1.54 | 6.49 | 1.25 |
| Avg. | 1.24 | 2.14 | 4.91 | 1.86 |
| Std. | 0.55 | 0.40 | 1.83 | 0.94 |

| Sample | ACM-DUB-0031-57-05 1) Apply Loctite 7091 2) Irradiate lapshears for 60 s 3) Apply Loctite AA3510, clamp bond and irradiate for 60 s 4) Leave for 24 h @ RT before testing 24 h @ RT N/mm$^2$ | ACM-DUB-0031-57-06 1) Apply Loctite 7091 2) Irradiate lapshears for 60 s 3) Apply Loctite AA3510, clamp bond 4) Leave for 24 h @ RT before testing |
|---|---|---|
| 1 | 14.80 | 9.87 |
| 2 | 15.20 | 9.34 |
| 3 | 15.30 | 6.47 |
| 4 | 15.90 | |
| 5 | 12.50 | |
| Avg. | 14.74 | 8.56 |
| Std. | 1.31 | 1.83 |

In Table 4 above:

the "ACM . . ." codes are an identifier reference/code for respective tests. "Loctite 3510" and "Loctite AA 3510" are the same product. (AA = anaerobic adhesive). Loctite ® products 3510 and 7091 are those discussed above. Each test was performed with three or five samples as labelled by "Sample" 1-5 above. The tensile shear strength results over the three/five tests were averaged as indicated by "Avg.". 24 hr @ RT N/mm$^2$ indicates the tensile shear strength in N/mm$^2$ after 24 hours at room temperature.

ACM-DUB-0031-57-01 is a comparative test where the Loctite ® 3510 is applied to the lapshears and the lapshears are clamped together and the assembly was placed in the UVALOC 1000 and exposed to the irradiation for 60 seconds at an intensity of 200 mW/cm$^2$ and then left for 24 hours before testing. This test omits priming and UV activation of the primed surface steps. It is comparable to test ACM-DUB-0031-52-02.

ACM-DUB-0031-57-02 is a comparative test where the Loctite ® 7091 primer is applied to the lapshears and the Loctite ® 3510 is applied to the primed lapshears and the lapshears are clamped together and left for 24 hours before testing. This test omits all UV exposure steps. It is comparable to test ACM-DUB-0031-52-04.

ACM-DUB-0031-57-03 is a comparative test where Loctite ® 7091 primer is applied to the lapshears and the lapshears were placed in the UVALOC 1000 and exposed to the irradiation for 60 seconds at an intensity of 200 mW/cm$^2$. Loctite ® 3510 is applied to the lapshears and the lapshears are clamped together and then left for 24 hours before testing. This test omits irradiation of the lapshears after they have been brought together. It is comparable to test ACM-DUB-0031-53-03

ACM-DUB-0031-57-04 is a comparative test where the lapshears were placed in the UVALOC 1000 and exposed to the irradiation for 60 seconds at an intensity of 200 mW/cm$^2$. Loctite ® 3510 is applied to the lapshears and the lapshears are clamped together and irradiated using the UVALOC 1000 and exposed to the irradiation for 60 seconds at an intensity of 200 mW/cm$^2$ and then left for 24 hours before testing. This test omits priming. It is comparable to test ACM-DUB-0031-53-02.

ACM-DUB-0031-57-05 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. It is comparable to test ACM-DUB-0031-53-04.

ACM-DUB-0031-57-06 is a comparative test where Loctite ® 7091 primer is applied to the lapshears and the lapshears which were then placed in the UVALOC 1000 and exposed to the irradiation for 60 seconds at an intensity of 200 mW/cm$^2$. Loctite ® 3510 is applied to the lapshears and the lapshears are clamped together and then left for 24 hours before testing. This test omits irradiation of the lapshears after they have been brought together. It is comparable to test ACM-DUB-0031-53-03.

By using a more directed UV irradiation step for the bonded assembly in particular it has been found that the tensile shear strengths can be even further improved.

Further testing was carried out as follows (with results shown in FIG. 1): Each test was performed with three samples. All samples were allowed to cure at room temperature for 24 hours before testing. The average tensile shear strength results over the three tests were calculated and are shown in FIG. 1. Appropriate units for tensile shear tests are N/mm$^2$. Each lap shear was of Waelzholz M310-65A and the overlap (bond area) is 322 mm$^2$ unless otherwise stated. All lapshears were clamped together unless otherwise stated. The results shown in FIG. 1 are for the following tests in the same order.

Loctite® AA 3510 is used as a control (without any UV exposure or priming). Loctite® AA 3510 has been applied to Waelzholz M310-65A as received and allowed to cure. As can be seen from FIG. 1 the tensile shear strength is low at less than 2 N/mm$^2$.

Loctite® AA 3510 and Loctite® 3038-part B—Loctite® 3038 is a two-component acrylic adhesive designed to cure on low activity plastics such as polyethylene. The part B has been combined with Loctite® AA 3510 to investigate if there is any improvement in performance. Loctite® AA 3510 and Loctite 3038-part B were applied to different lap shear within a pair of Waelzholz M310-65A lap shears as received. The compositions were brought together when the lapshears were brought together and clamped together and allowed to cure. As can be seen from FIG. 1 the tensile shear strength is still low at less than 2 N/mm$^2$.

Loctite® AA 3510 with UV primed lap shear with Loctite® 3038-part B—Loctite® 3038 is 2 component acrylic designed to cure on low activity plastics such as polyethylene. The part B component has been combined with Loctite AA3510 to investigate if there is any improvement in performance. This differs from the previous test insofar as both Waelzholz M310-65A lap shears have been primed with Loctite® 3038 part B and exposed to UV light using the Light Hammer® 6 for 60 seconds at an intensity of approx. 5 W/cm$^2$. Loctite® AA 3510 is then applied, clamped and allowed to cure for 24 hours. As can be seen from FIG. 1 the tensile shear strength is still low at about 7 N/mm$^2$.

Loctite® AA 3510 with Loctite® 7091 UV primed lap shear both sides Loctite® 7091 primer is applied to the lapshears and the lapshears which were then placed in the UVALOC 1000 and exposed to the irradiation for 60 seconds at an intensity of 200 mW/cm$^2$. Loctite® 3510 is applied to the lapshears and the lapshears are clamped together, exposed to UV light from the sides in the UVALOC 1000 and exposed to the irradiation for 60 seconds at an intensity of 200 mW/cm$^2$, clamped and then left for 24 hours before testing. This is a test that follows a method of the invention and as can be seen from FIG. 1 the tensile shear strength is much better at about 15 N/mm$^2$.

Loctite® AA 3510 with plasma treated lap shears-Both Lap shears have been plasma treated before bonding using a Tantec™ Plasma treatment system. The lap shears have been exposed to the plasma for 0.5 seconds and 1 cm away from the tip. Loctite® AA 3510 has been applied to one of the pre-treated lap shears, the lap shears were clamped and allowed to cure for 24 hours. As can be seen from FIG. 1 the tensile shear strength is relatively low at less than 8 N/mm$^2$. Furthermore, such treatment is undesirable as it tends to remove the insulation coating.

Loctite® AA 3510 with grit-blasted lap shear specimens-Both lap shears have been grit-blasted before bonding. Loctite® AA 3510 has been applied to one of the pre-treated lap shears, the lap shears were clamped and allowed to cure for 24 hours. As can be seen from FIG. 1 the tensile shear strength is above the target value of 10 N/mm$^2$, however such treatment is undesirable as it tends to remove the insulation coating. Loctite® HY 4070 is a two-component cyanoacrylate/acrylic hybrid with excellent bonding to a variety of plastics and metals. This has been used is used as a control (without any UV exposure or priming).

It will be noted that using a UV anaerobic primer Loctite® AA 7091 and Loctite® 3510 with UV treatment in accordance with a method of the invention can improve bond strength on substrates for example e-coated C5 steel such as e-coated steel—Waelzholz M310-65A according to EN10106—supplied with mill certificate to EN 10204—3.1 Waelzholz 2× AN8—C5 classified—2.0-6.0 μm thick per side 100 mm×25 mm E-coated steel to E-coat steel bonded with standard adhesive products produce low strengths as compared to those bonded using the method of the invention.

Tests within the method of the invention and comparative tests were repeated using the UVALOC 1000 where for both irradiation steps the assembly was placed in the UVALOC 1000 and exposed to the irradiation for 60 seconds at an intensity of 200 mW/cm$^2$ for both steps.

Various e-coated substrates were tested to compare with original e-coat Waelzholz M310-65A substrate.

The following C5 e-coated steel substrates were comparatively tested using a method not within the present invention and then using a method of the invention:

NO30-1500A Suralac 7000
M270-50AA Backlack Suralack 9000 (EB549)
M270-35AA Backlack Suralack 9000 (EB549)
M330-50 Backlack 2× PE 75 W
Waelzholz M310-65A-blue/grey substrate
Waelzholz M310-65A-Original

TABLE 5

(Comparative tests)

| Sample | E-coated C5 substrate: NO30-1500A Suralac 7000 | M270-35AA Backlack Suralack 9000 (EB549) Reference | M270-50AA Backlack Suralack 9000 (EB549) |
|---|---|---|---|
| | ACM-DUB-0031-81-02<br>1) Loctite 3510 - clamp bonds.<br>2) Irradiate lapshears for 60 s<br>3) Leave for 24 h @ RT before testing | ACM-DUB-0031-82-02<br>1) Loctite 3510 - clamp bonds.<br>2) Irradiate lapshears for 60 s<br>3) Leave for 24 h @ RT before testing<br>24 h @ RT N/mm$^2$ | ACM-DUB-0031-83-02<br>1) Loctite 3510 - clamp bonds.<br>2) Irradiate lapshears for 60 s<br>3) Leave for 24 h @ RT before testing |
| 1 | 0.07 | 3.88 | 6.47 |
| 2 | 0.31 | 3.43 | 3.18 |
| 3 | 0.56 | 2.43 | 3.02 |
| Avg. | 0.31 | 3.25 | 4.22 |
| Std. | 0.25 | 0.74 | 1.95 |

| Sample | E-coated C5 substrate: M330-50 Backlack 2x PE 75 W | Waelzholz M310-65A - blue/grey Reference | Waelzholz M310-65A |
|---|---|---|---|
| | ACM-DUB-0031-84-02<br>1) Loctite 3510 - clamp bonds.<br>2) Irradiate lapshears for 60 s<br>3) Leave for 24 h @ RT before testing | ACM-DUB-0031-85-02<br>1) Loctite 3510 - clamp bonds.<br>2) Irradiate lapshears for 60 s<br>3) Leave for 24 h @ RT before testing<br>24 h @ RT N/mm$^2$ | ACM-DUB-0031-86-02<br>1) Loctite 3510 - clamp bonds.<br>2) Irradiate lapshears for 60 s<br>3) Leave for 24 h @ RT before testing |
| 1 | 8.52 | 3.29 | 0.75 |
| 2 | 6.99 | 3.51 | 4.70 |
| 3 | 8.96 | 2.97 | 3.35 |

TABLE 5-continued

| (Comparative tests) | | | |
|---|---|---|---|
| Avg. | 8.16 | 3.26 | 2.93 |
| Std. | 1.03 | 0.27 | 2.01 |

In Table 5 above:
the "ACM . . ." codes are an identifier reference/code for respective tests. "Loctite 3510" and "Loctite AA 3510" are the same product. (AA = anaerobic adhesive). Each test was performed with three as labelled by "Sample" 1-3 above. The tensile shear strength results over the three tests were averaged as indicated by "Avg.". 24 hr @ RT N/mm$^2$ indicates the tensile shear strength in N/mm$^2$ after 24 hours at room temperature.
ACM-DUB-0031-81-02 is a comparative test where Loctite ® 3510 is applied to the lapshears and the lapshears are clamped together. The substrate is a comparative C5 e-coated lapshear, NO30-1500A Suralac 7000. The clamped bond is exposed to the irradiation for 60 seconds at an intensity of 200 mW/cm$^2$ and left for 24 hours before testing. This test omits the primer and irradiation of the primed substrate. It is comparable to test ACM-DUB-0031-52-02.
ACM-DUB-0031-82-02 is a comparative test where Loctite ® 3510 is applied to the lapshears and the lapshears are clamped together. The substrate is a comparative C5 e-coated substrate, M270-50AA Backlack Suralack 9000 (EB549). The clamped bond is exposed to the irradiation for 60 seconds at an intensity of 200 mW/cm$^2$ and left for 24 hours before testing. This test omits the primer and irradiation of the primed substrate. It is comparable to test ACM-DUB-0031-81-02.
ACM-DUB-0031-83-02 is a comparative test where Loctite ® 3510 is applied to the lapshears and the lapshears are clamped together. The substrate is a comparative C5 e-coated substrate, M270-35AA Backlack Suralack 9000 (EB549). The clamped bond is exposed to the irradiation for 60 seconds at an intensity of 200 mW/cm$^2$ and left for 24 hours before testing. This test omits the primer and irradiation of the primed substrate. It is comparable to test ACM-DUB-0031-81-02.
ACM-DUB-0031-84-02 is a comparative test where Loctite ® 3510 is applied to the lapshears and the lapshears are clamped together. The substrate is a comparative C5 e-coated substrate, M330-50 Backlack 2x PE 75 W. The clamped bond is exposed to the irradiation for 60 seconds at an intensity of 200 mW/cm$^2$ and left for 24 hours before testing. This test omits the primer and irradiation of the primed substrate. It is comparable to test ACM-DUB-0031-81-02.
ACM-DUB-0031-85-02 is a comparative test where Loctite ® 3510 is applied to the lapshears and the lapshears are clamped together. The substrate is a comparative C5 e-coated substrate, Waelzholz M310-65A -blue/grey substrate. The clamped bond is exposed to the irradiation for 60 seconds at an intensity of 200 mW/cm2 and left for 24 hours before testing. This test omits the primer and irradiation of the primed substrate. It is comparable to test ACM-DUB-0031-81-02.
ACM-DUB-0031-86-02 is a comparative test where Loctite ® 3510 is applied to the lapshears and the lapshears are clamped together. The substrate is the original C5 e-coated substrate, Waelzholz M310-65A used in previous experiments described above. The clamped bond is exposed to the irradiation for 60 seconds at an intensity of 200 mW/cm2 and left for 24 hours before testing. This test omits the primer and irradiation of the primed substrate. It is comparable to test ACM-DUB-0031-52-02.

Tests within the method of the invention (which can be compared to those in Table 5) were repeated using the UVALOC 1000 where for both irradiation steps the assembly was placed in the UVALOC 1000 and exposed to the irradiation for 60 seconds at an intensity of 200 mW/cm$^2$ for both steps.

Various e-coated substrates were tested to compare with original e-coat Waelzholz M310-65A substrate.

The following C5 e-coated steel substrates were tested:
NO30-1500A Suralac 7000
M270-50AA Backlack Suralack 9000 (EB549)
M270-35AA Backlack Suralack 9000 (EB549)
M330-50 Backlack 2× PE 75 W
Waelzholz M310-65A-blue/grey substrate
Waelzholz M310-65A-Original

TABLE 6

| (method of the invention) | | | |
|---|---|---|---|
| | E-coated C5 substrate | | |
| | NO38-1500A Suralac 7000 | M270-35AA Backlack Suralack 9000 (E8549) Reference | M270-50AA Backlack Suralack 9000 (EB549) |
| Sample | ACM-DUB-0031-81-06 1) Apply Loctite 7091 2) Irradiate lapshears for 60 s 3) Apply Loctite AA3510, clamp bond and irradiate for 60 s 4) Leave for 24 h @ RT before testing | ACM-DUB-0031-82-06 1) Apply Loctite 7091 2) Irradiate lapshears for 60 s 3) Apply Loctite AA3510, clamp bond and irradiate for 60 s 4) Leave for 24 h @ RT before testing 24 h @ RT N/mm$^2$ | ACM-DUB-0031-83-06 1) Apply Loctite 7091 2) Irradiate lapshears for 60 s 3) Apply Loctite AA3510, clamp bond and irradiate for 60 s 4) Leave for 24 h @ RT before testing |
| 1 | 10.90 | 13.50 | 20.20 |
| 2 | 11.30 | 13.50 | 19.30 |
| 3 | 11.00 | 13.40 | 19.30 |
| Avg. | 11.07 | 13.47 | 19.60 |
| Std. | 0.21 | 0.06 | 0.52 |

| | E-coated C5 substrate | | |
|---|---|---|---|
| | M330-50 Backlack 2x PE 75 W | Waelholz M310-65A - blue/grey Reference | Waelzholz M310-65A |
| Sample | ACM-DUB-0031-84-06 1) Apply Loctite 7091 2) Irradiate lapshears for 60 s 3) Apply Loctite AA3510, clamp bond and irradiate for 60 s 4) Leave for 24 h @ RT before testing | ACM-DUB-0031-85-06 1) Apply Loctite 7091 2) Irradiate lapshears for 60 s 3) Apply Loctite AA3510, clamp bond and irradiate for 60 s 4) Leave for 24 h @ RT before testing 24 h @ RT N/mm$^2$ | ACM-DUB-0031-86-06 1) Apply Loctite 7091 2) Irradiate lapshears for 60 s 3) Apply Loctite AA3510, clamp bond and irradiate for 60 s 4) Leave for 24 h @ RT before testing |
| 1 | 9.90 | 17.00 | 15.40 |
| 2 | 10.25 | 16.20 | 15.10 |
| 3 | 11.00 | 16.20 | 12.90 |

TABLE 6-continued

| (method of the invention) | | | |
|---|---|---|---|
| Avg. | 10.38 | 16.47 | 14.47 |
| Std. | 0.56 | 0.46 | 1.37 |

In Table 6 above:

the "ACM . . ." codes are an identifier reference/code for respective tests. "Loctite 3510" and "Loctite AA 3510" are the same product. (AA = anaerobic adhesive). Loctite ® products 3510 and 7091 are those discussed above. Each test was performed with three or five samples as labelled by "Sample" 1-5 above. The tensile shear strength results over the three/five tests were averaged as indicated by "Avg.". 24 hr @ RT N/mm$^2$ indicates the tensile shear strength in N/mm$^2$ after 24 hours at room temperature.

ACM-DUB-0031-81-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. NO30-1500A Suralac 7000 is a comparative C5 e-coated substrate that was tested in this experiment. It is comparable to test ACM-DUB-0031-57-05.

ACM-DUB-0031-82-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. M270-50AA Backlack Suralack 9000 (EB549) is a comparative C5 e-coated substrate that was tested in this experiment. It is comparable to test ACM-DUB-0031-57-05.

ACM-DUB-0031-83-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. M270-35AA Backlack Suralack 9000 (EB549) is a comparative C5 e-coated substrate that was tested in this experiment. It is comparable to test ACM-DUB-0031-57-05.

ACM-DUB-0031-84-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. M330-50 Backlack 2x PE 75 W is a comparative C5 e-coated substrate that was tested in this experiment. It is comparable to test ACM-DUB-0031-57-05.

ACM-DUB-0031-85-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. Waelzholz M310-65A -blue/grey substrate is a comparative C5 e-coated substrate that was tested in this experiment. It is comparable to test ACM-DUB-0031-57-05.

ACM-DUB-0031-85-06 is a test which falls within the scope of the present invention where Loctite ® 7091 primer is applied to the lapshears which were then placed in the UVALOC 1000 and exposed to the irradiation for 60 seconds at an intensity of 200 mW/cm$^2$. Loctite ® 3510 is applied to the lapshears and the lapshears are clamped together and within the UVALOC 1000 are exposed to the irradiation for 60 seconds at an intensity of 200 mW/cm$^2$ and then left for 24 hours before testing. This test includes all steps of the method of the present invention. Waelzholz M310-65A - Original is a comparative C5 e-coated substrate that was tested in this experiment. It is a repeat test of ACM-DUB-0031-57-05.

Figure 2:
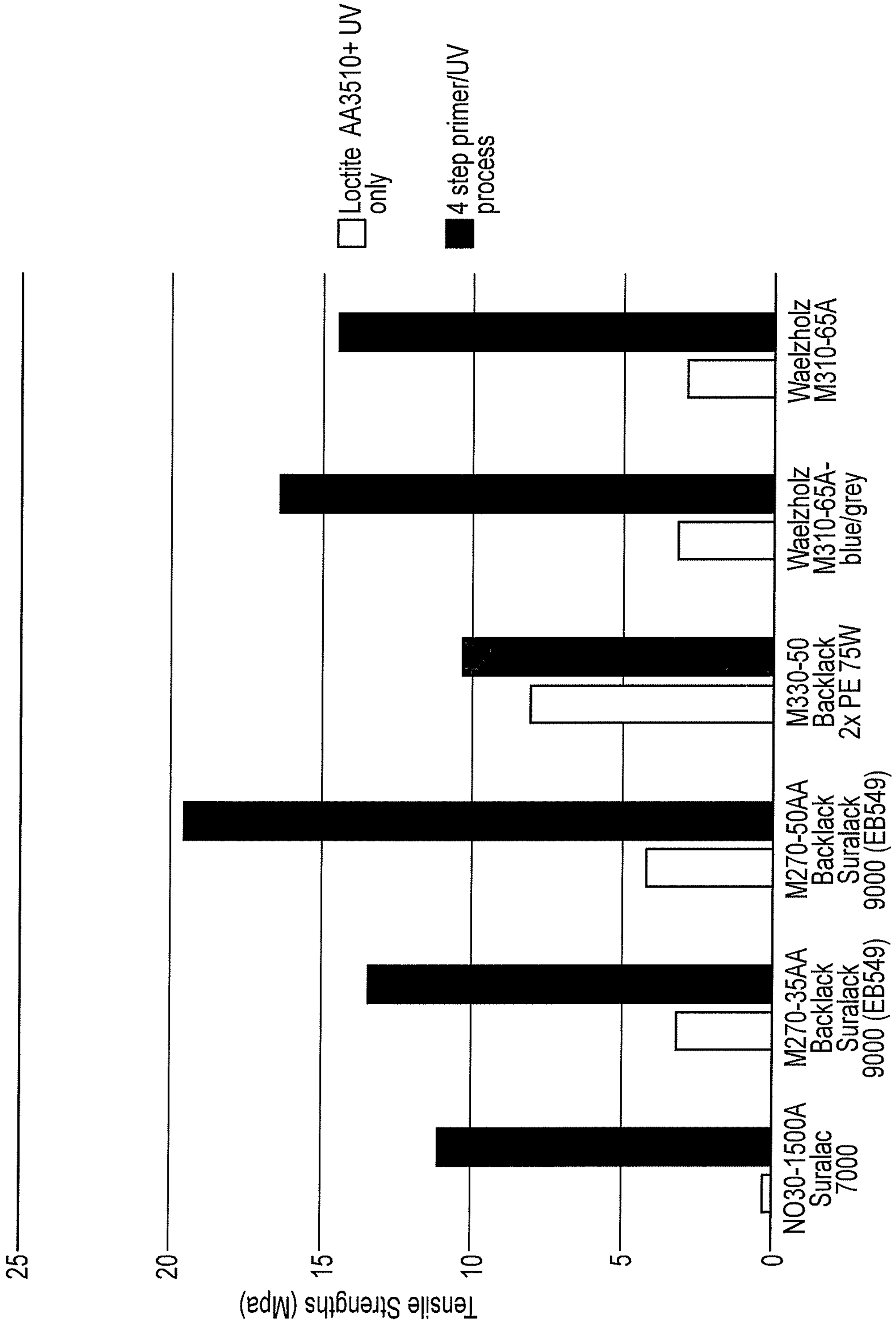
FIG. 2 is a plot of tensile shear strength in $N/mm^2$ for the substrates indicated and giving both comparative results (without using a method of the invention and labelled as "Loctite AA3510+UV only") and results using a method of the invention (labelled as "4 step primer/UV process").

The results of the testing above is shown in FIG. 2. In FIG. 2 the comparative results (from Table 5) are those shown on the left in each pair of columns while the results from using a method of the invention (from Table 6) are those shown on the right in each pair of columns. As can be clearly seen the results using a method of the invention are clearly better in all cases in achieving better tensile strengths.

The above tests demonstrate that the process of the invention significantly improves tensile strength performance on a range of C5 e-coated steel substrates.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method of bonding first and second substrates to each other the substrates having respective bonding surfaces to be bonded together, comprising:

(a) applying to the bonding surface of at least the first substrate a redox-active metal catalyst primer to form a primed surface;

(b) activating the primed bonding surface of the first substrate by exposing the primed bonding surface to actinic radiation;

(c) applying, to the so activated bonding surface of the first substrate, and/or to the bonding surface of the second substrate, a UV curable anaerobic adhesive;

(d) mating the bonding surfaces together with the UV curable anaerobic adhesive therebetween; and (e) exposing the UV curable anaerobic adhesive between the mated surfaces to actinic UV radiation.

2. A method according to claim 1 wherein:

step (a) comprises applying to the respective bonding surfaces of the first substrate and the second substrate a redox-active metal catalyst primer to form respective primed surfaces; and step (b) comprises activating the respective primed bonding surfaces of the first substrate and the second substrate by exposing those primed bonding surfaces to actinic radiation.

3. A method according to claim 2 wherein step (c) comprises applying, to the so activated bonding surface of the first substrate, and to the so activated bonding surface of the second substrate, a UV curable anaerobic adhesive.

4. A method according to claim 1 wherein the actinic radiation of step (b) has a wavelength of from about 10 nm to about 10,000 nm.

5. A method according to claim 1 wherein the duration of the exposure to the actinic radiation of step (b) is from 1 to 300 seconds.

6. A method according to claim 1 wherein the actinic radiation of step (b) has an intensity of 1 to 5000 mW/cm$^2$.

7. A method according to claim 1 wherein the total energy to which the primed bonding surface of the first substrate and/or the primed bonding surface of the second substrate is exposed during step (b) is from 1 to 300000 mJ/cm$^2$.

8. A method according to claim 1 wherein the actinic radiation of step (e) has a wavelength of from about 10 nm to about 10,000 nm.

9. A method according to claim 1 wherein the duration of the exposure to the actinic radiation of step (e) is from 1 to 300 seconds.

10. A method according to claim 1 wherein the actinic radiation of step (e) has an intensity of 1 to 5000 mW/cm$^2$.

11. A method according to claim 1 wherein a total energy to which the UV curable anaerobic adhesive is exposed during step (e) is from 1 to 300000 mJ/cm$^2$.

12. A method according to claim 1 wherein the redox-active metal catalyst primer comprises a redox-active metal catalyst selected from cobalt (II) naphthenate; copper carbonate; copper (II) acetylacetonate; silver nitrate; vanadium (III) acetylacetonate, iron (II) naphthenate, copper disodium ethylenediamine tetraacetic acid (EDTA·2Na·Cu(II)), vanadyl acetylacetonate, iron (II) acetate, or a combination thereof.

13. A method according to claim 1 wherein the redox-active metal catalyst primer comprises a copper-based primer.

14. A method according to claim 1 wherein the redox-active metal catalyst primer comprises at least one Cu II salt.

15. A method according to claim 14 wherein the Cu II salt is selected from Cu acac (copper (II) acetylacetonate) and copper (II) ethyl hexanoate such as copper (II) 2-ethyl hexanoate and combinations thereof.

16. A method according to claim 1 wherein the redox-active metal catalyst primer includes a the redox-active metal catalyst dissolved in a solvating agent, such as a reactive solvating agent for example a (meth)acrylate monomer such as hydroxy propyl methacrylate, methacrylic acid or propylene glycol dimethacrylate and combinations thereof.

17. A method according to claim 1 wherein the redox-active metal catalyst primer includes an organic solvent.

18. A method according to claim 1 wherein the redox-active metal catalyst primer comprises from 0.01 to 0.4% by weight based on the total weight of the solution, of an active redox-active metal catalyst.

19. A method according to claim 1 wherein at least one substrate is a substrate with a coating thereon and further wherein the coating is a coating applied by curing a curable coating composition on that substrate.

20. A method according to claim 19 wherein the substrate is steel optionally wherein the substrate forms a part of an electric motor.

21. A method according to claim 19 wherein the coating is formed from an epoxy resin, a phenolic resin, including phenol/formaldehyde resins, or a polyurethane resin or combinations thereof.

* * * * *